(# 2,773,798)

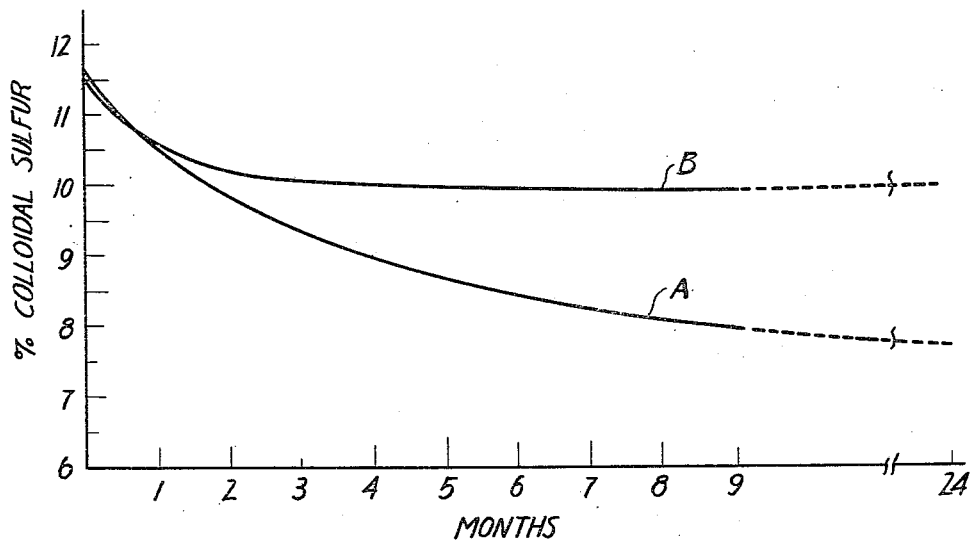

2,773,798

METHOD OF PRODUCING FUSED BENTONITE-SULFUR HAVING A STABLE COLLOIDAL SULFUR CONTENT

John F. Les Veaux, Middleport, N. Y., assignor to Food Machinery and Chemical Corporation, San Jose, Calif.

Application August 23, 1951, Serial No. 243,305

1 Claim. (Cl. 167—20)

The present invention relates to a method of stabilizing the colloidal sulfur content and biologic activity of so-called fused bentonite sulfur.

Fused bentonite sulfur is the product resulting from heating together at fusion temperature, bentonite clay and sulfur. Heating is continued between about 125° C. and about 160° C. until all of the sulfur is apparently absorbed by the bentonite clay. In general, fused bentonite sulfur contains from about 20% to about 50% total sulfur when made in accordance with the disclosures of Banks, as contained in U. S. Patent 1,550,650 granted August 18, 1925. Fused bentonite sulfur is an excellent all-purpose fungicide which is employed in large quantities for the control and inhibition of fungus growths.

In general, the fungicidal activity of the fused bentonite sulfur is directly related to the amount of colloidal sulfur present in the mixture. When initially prepared, fused bentonite sulfur may contain, for instance, 35% by weight total sulfur and yet have a content of colloidal sulfur of in the neighborhood of 12%.

However, on aging, as for instance after being bagged and shipped, the fused bentonite sulfur loses a considerable portion of colloidal sulfur content and, after about a month, the colloidal sulfur content may be found to be in the neighborhood of 9% and, after several months, in the neighborhood of 6 to 7%, and this is the general range of colloidal sulfur content present in the commercial fused bentonite sulfurs at the time they arrive at the place of use.

It is an object of the present invention to maintain the original content of colloidal sulfur in fused bentonite sulfur as near as possible to that present when the product is initially prepared.

It is therefore a corollary object of the invention to prevent excessive loss of the initial content of colloidal sulfur in fused bentonite sulfur.

In accordance with the broad aspects of the present invention, the product obtained by the usual fusion of sulfur and bentonite in the production of fused bentonite sulfur is immediately treated with water in an amount insufficient to destroy the characteristic granular texture of fused bentonite sulfur. This water is added as liquid water as, for instance, by spraying measured quantities of water on to the reaction product, keeping in mind that the quantity of water should be less than that required to change the composition to a pasty, sticky, viscous mass. It will be found that quantities of water, based on the weight of the initial fusion product, should be less than about 18% and, in general, should not exceed about 12%. It will be understood that the top limit in amount of water added will vary, depending upon the type and origin of the bentonite, the main purpose being to add water only in quantities insufficient in amount to produce the paste or gel so characteristic of water bentonite systems, but to maintain the granular condition of the product.

This water treated granular product may be bagged immediately and shipped for use or may be given a partial drying to reduce the moisture content to a point where the product is in general equilibrium with the ambient atmosphere as, for instance, to 4 to 6% moisture.

The loss of colloidal sulfur with age or shelf storage of a product which has been moistened with liquid water immediately after its manufacture, is very considerably less than the loss of colloidal sulfur of a product which is not so treated. This is shown very strikingly in the following example.

EXAMPLE I

A fused bentonite sulfur prepared from 2 parts bentonite and 1 part sulfur by weight, by fusion at 140° C. and immediately stored (designated sample A) showed the following progressive decrease in colloidal sulfur content with time. An analytical determination of the colloidal sulfur of the product as made showed the presence of 11.6% colloidal sulfur. After standing 4 months the colloidal sulfur content had decreased to 9% and after 9 months, to 7.9%. This is to say, after 4 months, the sample had suffered a decrease in colloidal sulfur content of approximately 22% and after 9 months, of 32%.

A sample of the fused bentonite sulfur prepared as described above, when sprayed with sufficient water immediately after production to bring the moisture content of the product to 9.2%, was placed in a container and allowed to age. This product is designated sample B. The initial content of colloidal sulfur was found to be 11.5%. After one month storage, the colloidal sulfur content had decreased to 10.6% and, after 3 months to 10.2%. It will be noted that after one month storage, the decrease in colloidal sulfur content was 7.8% and after 3 months was 11.3%, a rate of decrease of colloidal sulfur very considerably less than the rate of decrease in the sample not treated with water immediately after formation (sample A).

The decrease in colloidal sulfur content with time is given in Table I for samples A and B and is shown in the graph in the appended drawing.

Table I

| | Percent Colloidal Sulfur Content with Age | |
|---|---|---|
| | Sample A | Sample B |
| Initial | 11.6 | 11.5 |
| 1 month | 10.7 | 10.6 |
| 3 months | 9.6 | 10.2 |
| 4 months | 9.0 | 10.1 |
| 6 months | 8.4 | 10.0 |
| 9 months | 7.9 | 9.7 |

The colloidal sulfur content of the samples of fused bentonite sulfur was determined in accordance with the procedure outlined in Niagara Analytical Abstracts, published by Niagara Chemical Division, Food Machinery & Chemical Corporation, Middleport, New York, 5th edition, page 45.

Biologic assays of the effect of fused bentonite sulfur made in conventional manner and a product made in accordance with the principles of the present invention, showed a marked superiority in favor of the products of this invention since the fungus control to a particular level was obtainable with an application rate considerably less than the application rate required when applying conventional fused bentonite sulfur.

This is shown strikingly in the following example wherein young bean plants were sprayed with a standard spray solution of commercial fused bentonite sulfur (sample A) and the amount of fungicide determined to give a specific control level. The fungus employed was *Uromyces appendiculatus*. In order to obtain a 50% control, that is obtain plants having on average 50% as much rust as plants inoculated with *Uromyces appendiculatus* but not treated with the fungicide, required 57 parts per million of ordinary fused bentonite sulfur designated as sample A, as contrasted with 38 parts per million of a product made in accordance with the present invention, i. e., sample B.

It is believed that due to the unusual lamellar structure of bentonite clay, the moistening effect of the added liquid water induces an intercrystalline strain between the adjacent lamella whereby to lodge the colloidal sulfur produced during the fusion more securely between the adjacent lamella and, in effect, prevent their loss from the crystal structure and subsequent agglomeration into particles of macroscopic size. It is believed that this theory of the action of the water is substantiated by the excellent biologic results obtained from the aged product treated according to the present invention as well as the supporting chemical assays.

What is claimed is:

The method of producing fused bentonite sulfur having a relatively stable colloidal sulfur content upon aging, which comprises heating bentonite clay and sulfur in the proportions by weight of 4 parts bentonite clay to one part sulfur to one part bentonite clay to one part sulfur, at a temperature in the range 125° C. to 160° C. until fused bentonite sulfur is produced and then before the initial content of colloidal sulfur in the product so produced has decreased substantially, adding liquid water to the fused bentonite sulfur until there is produced therein a water content between about 5% and 18% based upon the dry weight of the fused bentonite sulfur, whereby the initial colloidal sulfur content of the fused bentonite sulfur is maintained at substantially its initial concentration.

References Cited in the file of this patent

UNITED STATES PATENTS

| | | |
|---|---|---|
| 1,550,650 | Banks | Aug. 18, 1925 |
| 1,662,550 | Vreeland | Mar. 13, 1928 |
| 1,853,397 | Banks | Apr. 12, 1932 |
| 1,934,989 | McDaniel | Nov. 14, 1933 |
| 2,664,379 | Russo et al. | Dec. 29, 1953 |

OTHER REFERENCES

De Ong: Journal Economic Entomology, vol. 17, pages 533 to 538, Oct. 1924.